(12) United States Patent
Khazaai et al.

(10) Patent No.: US 12,098,967 B2
(45) Date of Patent: Sep. 24, 2024

(54) TORQUE AND ANGLE SENSING DEVICE

(71) Applicant: BOURNS, INC., Riverside, CA (US)

(72) Inventors: Jay Jamshid Khazaai, Commerce, MI (US); Gregory S. DePue, Tustin, CA (US)

(73) Assignee: BOURNS, INC., Riverside, CA (US)

( * ) Notice: Subject to any disclaimer, the term of this patent is extended or adjusted under 35 U.S.C. 154(b) by 125 days.

(21) Appl. No.: 17/314,540

(22) Filed: May 7, 2021

(65) Prior Publication Data

US 2022/0357223 A1 Nov. 10, 2022

(51) Int. Cl.
*G01L 3/10* (2006.01)
*G01P 3/481* (2006.01)

(52) U.S. Cl.
CPC .............. *G01L 3/109* (2013.01); *G01L 3/101* (2013.01); *G01P 3/481* (2013.01)

(58) Field of Classification Search
CPC ........... G01L 3/109; G01L 3/101; G01P 3/481
See application file for complete search history.

(56) References Cited

U.S. PATENT DOCUMENTS

| | | | |
|---|---|---|---|
| 5,508,609 A | 4/1996 | Parkinson et al. |
| 6,238,316 B1 | 5/2001 | Sturm |
| 6,498,474 B1 | 12/2002 | Turner |
| 6,590,385 B2 | 7/2003 | Valles |
| 7,194,921 B1 | 3/2007 | Fergus et al. |
| 8,666,682 B2 | 3/2014 | LaVigne et al. |
| 9,046,429 B2 | 6/2015 | Hibi et al. |
| 9,157,816 B2 | 10/2015 | Smutzer et al. |
| 9,176,024 B2 | 11/2015 | Jensen et al. |
| 9,176,159 B2 | 11/2015 | Edwards et al. |

(Continued)

FOREIGN PATENT DOCUMENTS

| CN | 111487045 | 8/2020 |
| WO | WO 2019/021262 | 1/2019 |

(Continued)

OTHER PUBLICATIONS

International Search Reported dated Jul. 7, 2022 for International App. No. PCT/US22/22051.

(Continued)

*Primary Examiner* — Matthew G Marini
*Assistant Examiner* — Leo T Hinze
(74) *Attorney, Agent, or Firm* — Knobbe, Martens, Olson & Bear, LLP

(57) ABSTRACT

Aspects of this disclosure relate to a torque and angle sensing device. A sensor and a processing circuit are integrated into the device. The sensor is configured to generate a first signal indicative of a first angle and/or speed. The device includes an input contact configured to receive a second reference signal indicative of a second reference angle and/or speed. The processing circuit is configured to generate an indication of torque based on at least the first signal and the second signal. In certain applications, the processing circuit is capable of pre-programming and/or learning and storing the reference information and generating an indication of torque based on the first signal generated internally and the reference information. An output contact of the device can provide the indication of torque. Related systems and methods are also disclosed.

22 Claims, 13 Drawing Sheets

(56) References Cited

U.S. PATENT DOCUMENTS

| | | |
|---|---|---|
| 9,752,942 B2 | 9/2017 | Jolly et al. |
| 2007/0159126 A1 | 7/2007 | Kanekawa et al. |
| 2008/0007251 A1 | 1/2008 | Lee |
| 2008/0257069 A1 | 10/2008 | Poirier et al. |
| 2017/0043462 A1 | 2/2017 | Brebant |
| 2017/0170773 A1 | 6/2017 | Donolo |
| 2018/0003578 A1* | 1/2018 | Leonard .............. B60R 16/0232 |
| 2019/0242764 A1 | 8/2019 | Nicholl et al. |
| 2019/0326843 A1 | 10/2019 | Kawai et al. |
| 2020/0116580 A1 | 4/2020 | Appleton et al. |
| 2020/0166418 A1* | 5/2020 | Howard .................. G01L 3/102 |
| 2020/0240286 A1 | 7/2020 | Hill |
| 2020/0240863 A1 | 7/2020 | Ishii et al. |
| 2020/0321903 A1 | 10/2020 | Harada et al. |

FOREIGN PATENT DOCUMENTS

| | | |
|---|---|---|
| WO | WO 2020/037019 | 2/2020 |
| WO | WO 2020/037019 A1 | 2/2020 |

OTHER PUBLICATIONS

Written Opinion dated Jul. 7, 2022 for International App. No. PCT/US22/22051.

Bourns, "Torque and Angle Sensor Combo," Rev. Feb. 2012, 1 page, available at: https://bourns.com/docs/technical-documents/technical-library/automotive/datasheets/TAS.pdf?sfvrsn=34e992e0_2 (accessed: May 10, 2021).

Bourns, "Bourns® Automotive Product Focus: Speed Sensors," https://www.bourns.com/docs/automotive/product-focus/speed-sensors.pdf?sfvrsn=81c89f1_16 (accessed: May 10, 2021).

* cited by examiner

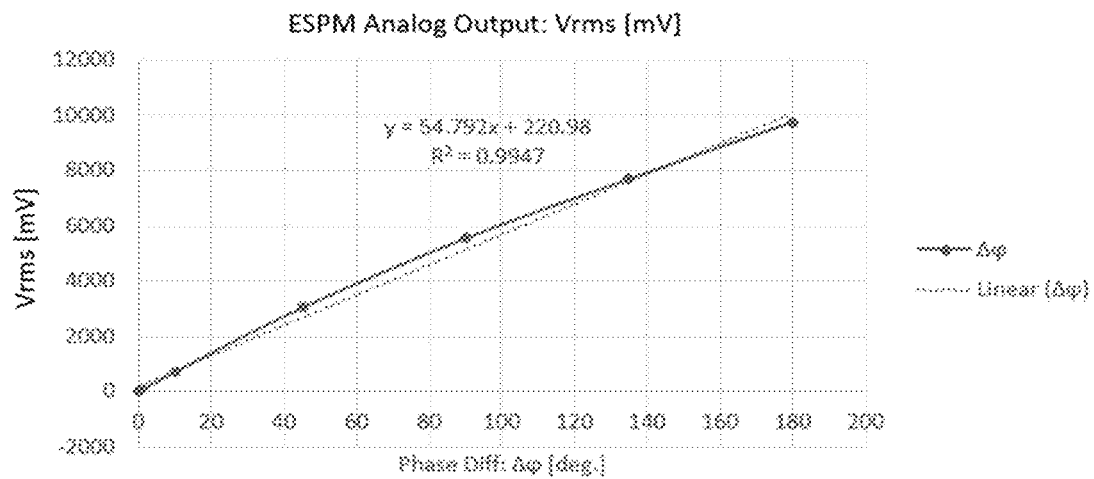
FIG. 5
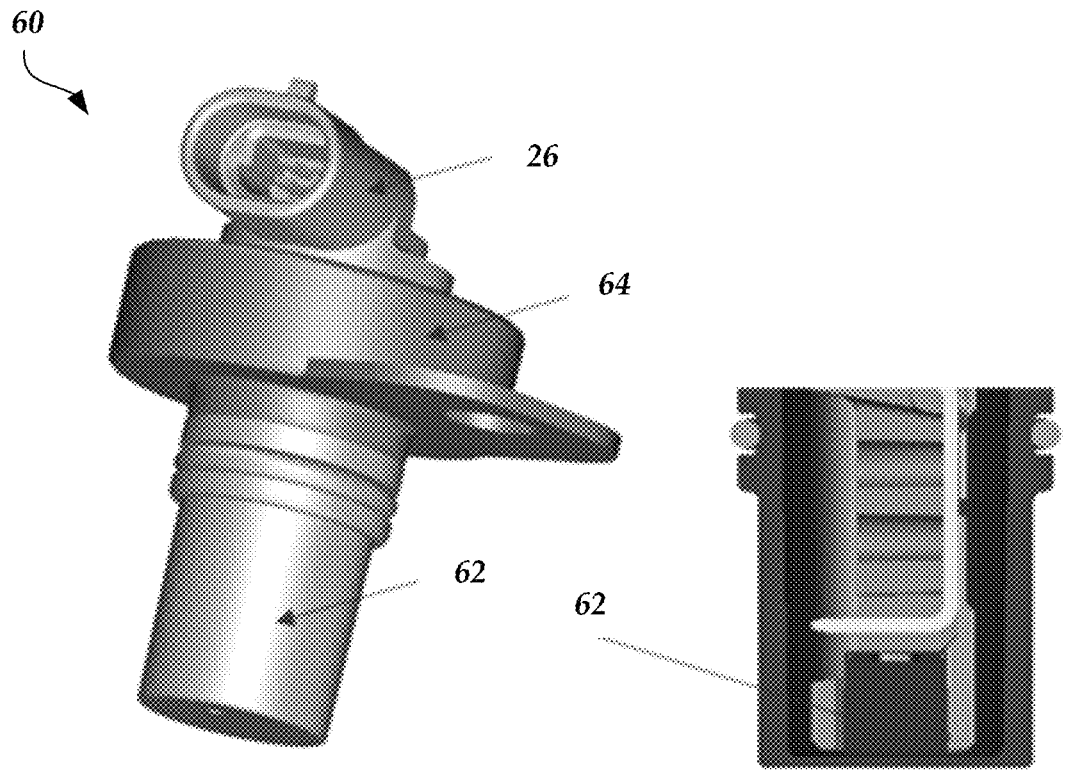
FIG. 6A  FIG. 6B

TORQUE AND ANGLE SENSING DEVICE

BACKGROUND

Technical Field

Embodiments of this disclosure relate to measuring torque using sensors.

Description of the Related Technology

Measuring torque applied to a shaft is useful in a variety of applications. Some example applications are in vehicles. For instance, measuring torque applied to a shaft can be useful for wheel speed sensing, which can be a significant input for dynamic brake control systems such as Anti-Lock Braking System (ABS), Electronic Stability System (ESS), Steering Angle Sensor (SAS), Advanced Driving Assistance System (ADAS), and the like.

Certain torque measuring systems depend strongly on the application and are not sufficiently versatile to use in different configurations within similar applications. Existing torque measuring systems are relatively costly and include a variety of complexities. Accordingly, improved torque measurement systems are desired.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a method of measuring torque applied to a shaft. The method comprises generating, with a first sensor, a first signal indicative of an angle and/or speed associated with a first reference connected to the shaft. The method also comprises receiving, from a second sensor, a second signal indicative of an angle and/or speed associated with a second reference connected to the shaft. The method further comprises determining, with a processing circuit, an indication of torque applied to the shaft based on at least the first signal and the second signal. The first sensor and the processing circuit are integrated in a device, and the second sensor is external to the device.

The method can include programming the device as a master unit, in which the device is also programmable as a slave unit. The device can be configured as a master unit and the second sensor can be included in a slave unit.

The second sensor and a second processing circuit can be integrated within a second device. The method can further comprise comparing, by the processing circuit, a second indication of torque applied to the shaft generated by the second processing circuit with the indication of torque.

Determining the indication of torque can comprise detecting a phase difference between the first signal and the second signal. Determining the indication of torque can comprise accessing calibration information stored in memory of the device.

The first reference can be a first tone-wheel. The second reference can be a second tone-wheel. The shaft can be located in a vehicle. The shaft can be located in a machine.

The method can further comprise detecting an indication of temperature associated with the device using a temperature sensor of the device. The method can include applying temperature compensation based on the indication of temperature.

Another aspect of this disclosure is a torque and angle sensor device that comprises an input contact, an output contact, a first sensor, and a processing circuit. The input contact is configured to receive a second signal indicative of a second reference angle/speed from an external device. The output contact is configured to provide an indication of torque. The first sensor is configured to generate a first signal indicative of a first angle/speed. The processing circuit is configured to generate the indication of torque based on at least the first signal and the second signal. The first sensor and the processing circuit are integrated within the device.

The processing circuit can be programmable to function as a master unit in a first mode and to function as a slave unit in a second mode. The processing circuit can be configured to generate the indication of torque based on comparing a first indication of torque determined by the processing circuit with a second indication of torque generated by the external device.

The sensor can be a variable reluctance sensor. The sensor can be a magnetic sensor. The sensor can be an inductive sensor. The sensor can be an optical sensor.

The first signal can be associated with a first tone-wheel or magnet-wheel connected to a shaft. The second signal can be associated with a second tone-wheel or magnet-wheel connected to the shaft. The indication of torque can represent torque applied to the shaft.

The processing circuit and the sensor can both be included within a housing of the torque and angle sensor device.

Another aspect of this disclosure is a system for measuring torque applied to a shaft. The system comprises a torque and angle sensing device and a second sensor external to the torque and angle sensing device. The torque and angle sensing device comprises a first sensor and a processing circuit. The first sensor is configured to generate a first signal indicative of an angle and/or speed associated with a first reference connected to the shaft. The processing circuit is configured to determine an indication of torque applied to the shaft based on at least the first signal and a second signal indicative of an angle and/or speed associated with a second reference connected to the shaft. The second sensor is configured to generate the second signal.

The second sensor can be included in a second torque and angle sensing device. The second torque and angle sensing device can be programmed as a slave unit.

The second sensor can be included in a second torque and angle sensing device, and the he second torque and angle sensing device can be configured to generate a second indication of torque applied to the shaft. The torque and angle sensor device can be configured to compare the indication of torque with the second indication of torque.

The second sensor can be a standalone sensor.

Another aspect of this disclosure is a method of measuring torque applied to a shaft. The method includes generating, with a sensor that is integrated with a processing circuit in a device, a first signal indicative of an angle and/or speed associated with a first reference connected to the shaft. The method also includes determining, with the processing circuit, an indication of torque applied to the shaft based on at least the first signal and a second signal.

The method can include receiving the second signal from a second sensor that is external to device. Alternatively, the second signal can be generated by the device without an external sensor. The method can include receiving pre-programming information and storing the pre-programming information to memory, in which the second signal represents the pre-programming information.

Another aspect of this disclosure is a torque and angle sensing device for measuring torque applied to a shaft. The torque and angle sensing device comprises a sensor and a processing circuit. The sensor is configured to generate a first signal indicative of an angle and/or speed associated with a first reference connected to the shaft. The processing circuit is configured to determine an indication of torque applied to the shaft based on at least the first signal and second reference information stored in memory of the torque and angle sensing device. The sensor and the processing circuit are integrated in the torque and angle sensing device.

The second reference information can be pre-programmed. The second reference information can be generated by the torque and sensing device without an external sensor.

These and other embodiments are described in greater detail below with reference to the Figures. For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will be described, by way of non-limiting example, with reference to the accompanying drawings.

FIG. 5 is a plot of an uncompensated torque signal provided as an analog output of the electronic signal processing module and a linear reference curve.

FIGS. 6A and 6B illustrate an example TAMS device with an active sensor according to an embodiment.

DETAILED DESCRIPTION OF CERTAIN EMBODIMENTS

Figure 1:
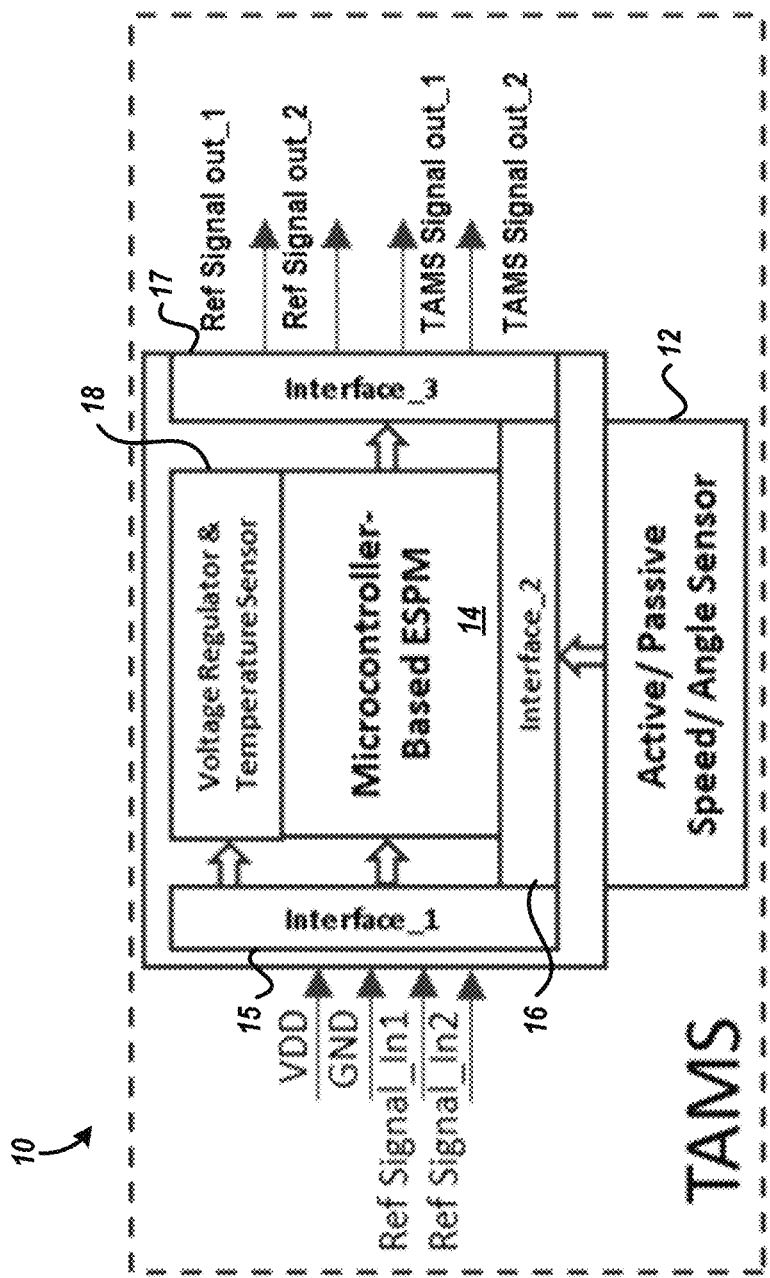
FIG. 1 is a schematic block diagram of a Torque and Angle Measuring Sensor (TAMS) device according to an embodiment.

The following detailed description of certain embodiments presents various descriptions of specific embodiments. However, the innovations described herein can be embodied in a multitude of different ways, for example, as defined and covered by the claims. In this description, reference is made to the drawings where like reference numerals and/or symbols can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Torque and Angle Measuring Sensor (TAMS) devices are disclosed. The TAMS devices can compute torque applied on a shaft, such as a rotary shaft or a non-rotary shaft. A TAMS device can include a built-in speed/angle sensor and a processing circuit in a single compact unit. The processing circuit include a microcontroller, for example. The TAMS device can also include a temperature sensor. The temperature sensor can be used for temperature compensation in torque calculations. The TAMS device can include analog and/or digital electronic interfaces.

A torque measuring system can include a shaft, two references such as two tone-wheel gears or multi-poles magnet-wheels, a TAMS device, and a sensor external to the TAMS device. The sensor external to the TAMS device can be a standalone speed/angle sensor in certain instances. The sensor external to the TAMS device can be included in a second TAMS device in some other instances. The second TAMS device can be a slave unit or a master unit.

In some cases, a torque measuring system can include a shaft, one reference such as one tone-wheel gear or multi-pole magnet-wheel, and a TAMS device. The TAMS device can dynamically generate the first signal from rotation of the reference. TAMS device can learn, memorize, or be pre-programmed for secondary information. For example, in some instances, the secondary information can be learned from a reference wheel with no load at different directional speeds. The secondary information can be a reference signal, a data set representing a reference signal that can be determined from a function of a processing circuit of the TAMS device, or the like. The secondary information can be stored in memory of the TAMS device. The TAMS device can determine an indication of torque applied to the shaft based on at least the first signal generated by a sensor of the TAMS device and the secondary information. The sensor can be any suitable sensor disclosed herein. TAMS devices disclosed herein can be programmable (1) compute torque based on a signal from an integrated sensor and secondary information stored in memory of the TAMS device and/or (2) compute torque based on a signal from an integrated sensor and an input signal from an external sensor.

Embodiments disclosed herein can provide a high performance (e.g., in terms of one or more of linearity, accuracy, resolution, or repeatability) smart torque/rotational angle measuring system with diagnostics and programmability features to make the system versatile for a variety of different applications and configurations.

Design of tone-wheel torque measuring systems using distributed speed sensing devices and electronic control units can be application-dependent and not sufficiently versatile to use the system in different configurations within the same application. A distributed torque measuring system can have disadvantages of complexities in assemblies, wirings, adjustments, calibrations, and/or maintenance. Accordingly, such a distributed torque measuring system can be relatively costly.

Integrated torque sensing systems disclosed herein can resolve such complexities while adding flexibility in applications with different configurations. TAMS devices with an integrated speed/angle sensor are disclosed. The TAMS device can be programmable to function as a master unit or slave unit. The TAMS device can compute a torque or rotational angle applied on a shaft. The TAMS device can be programmed and work with a variety of other external electrical speed/angle sensor(s). The TAMS device can also be included in a system for measuring torque that also includes one or more other similar TAMS devices to create a functional redundancy and/or plausibility in the system. Data transmission between TAMS devices can be achieved in variety of ways, include wired and/or wireless communications with analog and/or digital format.

Regardless of what sensing technology is used, one or more of accuracy, hysteresis, repeatability, linearity, and the like of the sensing device output are significant parameters of design, and they can be even more significant in magnetic technology. For more accurate torque and/or angle measurements, most sensing applications involve a low non-linearity in calibration and low mechanical and magnetic hysteresis/errors in the system. There is a continual challenge to minimize measurement errors while there are unwanted system variations and noises such as one or more of: three dimensional mechanical movements due to inaccuracy of part assemblies, variation in system material properties, variation in sensing elements, magnetic hysteresis, and variation in tone-wheel physical and mechanical features such as tooth surface shape and dimensions, and so on. In general, besides the low tolerance mechanical system design, the accuracy of the magnetic sensors can be defined by techniques used in the design of their magnetic circuits, including one or more of: magnetic material properties of sensor structural and surrounding parts, magnet type and magnetization, physical dimensions, undesired magnetic and mechanical noises, magnetic sensing element type and technology, and measuring system configuration including air gaps and calibration. There are many different parameters that can play significant roles in the accuracy of torque and/or angle calculations. Accordingly, a highly reliable TAMS device can involve facilitating a low offset and low temperature drift electronics and programmable unit for high-speed multi-algorithm processing, parameter calibrations, and/or data storage.

Embodiments disclosed herein can provide a high-performance torque and angle measuring device by reducing, minimizing, or eliminating error sources in a sensing circuit (e.g., a magnetic sensing circuit), adjustable mechanical mounting for a desired air gap, robust design for multiple applications with programmability and configurability of desired calibration and/or algorithms, functional redundancy and plausibility, and diagnostic capabilities (e.g., self-safety and/or health-check).

TAMS devices are an integrated and programmable torque and angle sensor designed for measuring applied torque and twisting angle on a referenced shaft. Such a referenced shaft is connected to one or two tone-wheels or magnet-wheels. The TAMS device can be a microcontroller-based active or passive speed/angle sensor that is programmable to dynamically compute torque and other necessary functions (speeds, rotational directions, and angles) as a torque sensing device. The built-in sensor in a TAMS device can be any sensor suitable for sensing angle and/or speed. For example, the built-in sensor can be a passive sensor such as a variable reluctance (VR) sensor, or an active sensor such as a magnetic hall-effect sensor, a magnetic AMR (anisotropic magneto-resistive) sensor, a magnetic GMR (giant magneto-restive) sensor, a magnetic TMR (tunnel magneto-resistive) sensor, an inductive sensing system, an optical sensor, or any other suitable sensor. An inductive sensing system includes an integrated circuit (IC) connecting to a multi-turn primary (transmitter) and secondary (receivers) coils built on a printed circuit board (PCB) as sensing elements. The TAMS device can be programmed to function as a master unit or slave unit in a torque and angle measuring system. As a master unit, the TAMS can monitor and read tone-wheel angle and physical tooth profile information from both the built-in sensor and an external angle/speed sensor. The external sensor can be a standalone sensor, or a sensor included in a second TAMS device. The TAMS device can determine a mechanical twisting angle difference between the two references, such as two tone-wheels or magnet-wheels, associated with a shaft and calculate the torque applied on the shaft.

In some embodiments, a TAMS device can also include an internal temperature sensor to measure the temperature affecting sensor functionality. The TAMS device can apply a temperature compensation algorithm for determining torque and/or angle.

Functionalities of a TAMS device will now be discussed. The TAMS device can dynamically detect, monitor, read, process, analyze and capture the angular speeds (directional angular velocity) and angular positions of a rotating shaft, as well as the tooth profile information of the tone-wheels or magnetic field profile of the magnet-wheels (indicatives of speed/angle signals) received from an internal master and/or external slave sensor. The master sensor can be a built-in speed sensor. The master sensor can be an active sensor or a passive sensor. The slave sensor can be a standalone external speed sensor or a speed sensor of a secondary TAMS device. The slave sensor can be an active sensor or a passive sensor. The TAMS device can measure a phase difference between signals from the master sensor and the slave sensor.

The TAMS device can detect a direction of rotation of the tone-wheels connected to the shaft. The TAMS device can detect the direction of torque applied to a rotating shaft from zero to ultra-high RPM (rotation per minute) per design.

The TAMS device can learn and capture all related functions and/or algorithms and parameters for calculating torque and/or angle values of the rotating shaft. The TAMS device can be programmed for different methods of torque calculation (e.g., phase measurement based on zero-crossing, Fast Fourier Transform (FFT), or other techniques). The TAMS device can store calibration parameters and be programmed with one or more algorithms for calculating the torque applied to the shaft. The TAMS device can learn and capture mechanical sizes and/or shape features of tone-wheels and/or other references and apply such information for functional calculations, plausibility, and (electro)mechanical diagnostics.

The TAMS device can calculate the torque applied on a shaft connecting the two references, such as tone-wheels/magnet-wheels, based on measured differential phase of the two independent signals received from a built-in sensor and an external sensor.

In systems that include a secondary TAMS device, a first TAMS device can capture and compare the calculated torque information received from the second TAMS device. This can provide a functional redundancy and plausibility check in torque and/or angle measurement.

The TAMS device can capture the tone-wheel speed and rotational direction data, applied torque and direction of applied torque. Then the TAMS device can transmit the information digitally via any suitable interface (e.g., Controller Area Network (CAN), Local Interconnect Network (LIN), Serial Peripheral Interface (SPI), Pulse Width Modulation (PWM), Inter-Integrate Circuit (I2C), or Universal Asynchronous Receiver/Transmitter (UART) interfaces) and/or a relatively high-resolution analog format. The TAMS device can detect and output zero-crossing information from a built-in passive or active speed/angle sensor.

The TAMS device can measure and/or report temperatures affecting sensor functionality. The TAMS device can apply temperature compensation in determining torque applied to the shaft.

The TAMS device input/outputs (I/Os) can be protected by electronic filtering components to reduce, minimize, and/or eliminate the effects of transient signals, such as electromagnetic compatibility (EMC), electromagnetic interference (EMI), and/or electrostatic discharge (ESD) transient signals. The TAMS device I/O interfaces can be designed to condition the input and/or output signals as desired.

The TAMS devices disclosed herein can be applied in any suitable shaft torque sensing system. Such technical solutions can be applied in any suitable industries, including industries where functional redundancy and plausibility is desired, such as industrial machinery and equipment, robotic, automotive, aerospace, electric vehicle (EV), autonomous vehicle (AV), and medical equipment.

FIG. 1 is a schematic block diagram of a TAMS device 10 according to an embodiment. As illustrated, the TAMS device 10 includes a sensor 12, a processing circuit 14, I/O interfaces 15, 16, and 17, and a voltage regulator and temperature sensor 18. The sensor 12, the processing circuit 14, and the voltage regulator and temperature sensor 18 can be included within a housing of the TAMS device 10.

The sensor 12 is integrated within the TAMS device 10. The sensor 12 is included in the same packaging as the processing circuit 14. The sensor 12 can detect and generate a signal containing angle and/or directional speed information associated with a rotating shaft. The sensor 12 can be an active sensor in many applications, especially where near-zero speed measurement is desired. The sensor 12 can be a passive sensor in certain applications. The processing circuit 14 can determine the angular position and/or the angular speed of a rotating shaft and its direction based on an output signal of the sensor 12. Rate of angle change can be indicative of angular speed ($\omega=d\theta/dt$). Similarly, Angular speed can be indicative of angle "$\theta$" and its changes "$\Delta\theta$" by time 't'. Accordingly, a signal generated by the sensor 12 is time dependent and can be indicative of both angular position and angular speed of a rotating shaft. The signal generated by the sensor 12 is indicative of at least one of angular position or angular speed of the rotating shaft.

Depending on the application, the processing circuit 14 can include a simple microcontroller or a powerful microcontroller with digital signal processing capabilities to run more complex algorithms for more powerful and faster computations. For example, the processing circuit can be a custom-designed microprocessor-based Electronic Signal Processing Module (ESPM) to meet any application with specific requirements. The processing circuit 14 can be programmable. The processing circuit 14 can compute torque based on an output signal of the sensor 12 received internally at interface 16 and an output of a sensor external to the TAMS device 10 that is received at an I/O contact of the first I/O interface 15. The I/O contact can be a pin, a pad, a bump, or any other suitable contact for receiving an input signal. The processing circuit 14 can include memory storing one or more parameters for computing angle and/or torque.

The processing circuit 14 can compute torque based on an output signal of the sensor 12 only received at interface 16 and one or more reference signal(s) pre-programmed and/or learned and captured in memory. The reference signals at different conditions can be provided to the processing circuit 14 to memorize via I/O contact of interface 15. In this case, the TAMS 10 functions as a stand-alone device to compute the torque.

The TAMS 10 includes I/O interfaces 15, 16, and 17 that are suitable for receiving and/or outputting signals. One or more of the I/O interfaces 15, 16, and 17 can be arranged to process digital signals. One or more of the I/O interfaces 15, 16, and 17 can be alternatively or additionally arranged to process analog signals.

The first I/O interface 15 can receive signals from external to the TAMS device 10 and provide the received signals to the processing circuit 14 and/or the voltage regulator and temperature sensor 18. The first I/O interface 15 can process the received signals. The first I/O interface 15 can receive a common ground signal GND for the TAMS device 10. The first I/O interface 15 can receive a power supply voltage VDD for the TAMS device 10. The first I/O interface 15 can receive one or more reference signals Ref Signal_In1, Ref Signal_In2 that indicate measured tone-wheel information and status from an external sensor or device, such as a sensor of a secondary TAMS device, a tester, a simulator device, or a programmer to provide reference signals. The one or more reference signals Ref Signal_In1, Ref Signal_In2 can provide an indication of angle and/or speed associated with a reference, such as a second tone-wheel or magnet-wheel.

The second I/O interface 16 can provide an output signal from the sensor 12 to the processing circuit 14. The second I/O interface 16 can process the output signal from the sensor 12. Such processing can include one or more of filtering, signal amplification, or the like.

The third I/O interface 17 can receive signals from the processing circuit 14 and output the received signal external to the TAMS device 10. The third I/O interface 17 can output one or more TAMS output signals TAMS Signal_Out1, TAMS Signal_Out2 that indicate the calculated torque/angle information and/or measuring system diagnostics to an external electronic control module (ECU). The third I/O interface 17 can output one or more reference signals Ref Signal_Out1, Ref Signal_Out2 that indicate measured tone-wheel/magnet-wheel information and status based on the output signal from the sensor 12. The one or more reference signals Ref Signal_Out1, Ref Signal_Out2 can provide an indication of angle and/or speed associated with a reference, such as a tone-wheel/magnetic-wheel. These signals can be also used by another external TAMS device to compute torque as the TAMS device 10 does.

The voltage regulator and temperature sensor 18 includes a voltage regulator that provides a regulated voltage to the processing circuit 14. Based on the power supply voltage VDD received at the first I/O interface 15, the voltage regulator provides an assurance to generate a certain power (voltage and current) to energize the entire processing circuit 14 and interfaces 15, 16, and 17 at a certain level for more accurate and repeatable TAMS performance. The voltage regulator and temperature sensor 18 includes a temperature sensor. The processing circuit 14 can be configured to perform temperature compensation based on the output of the temperature sensor. This can improve accuracy of TAMS measuring and computing functions.

The TAMS device 10 can be used in a variety of applications. Wheel speed sensing is a significant input for dynamic brake control systems such as Anti-Lock Braking Systems (ABS), Electronic Stability Systems (ESS), Steering Angle Sensing (SAS) systems, and Advanced Driving Assistance Systems (ADAS). Applications include detecting and measuring speed and torque applied on a shaft with a tone-wheel, for example, as shown in FIG. 2C.

Examples of the sensor 12 of the TAMS device 10 for wheel speed and torque measurement applications include a passive sensor using variable reluctance and an active sensor using a solid-state integrated circuit. Magnetic speed sensors are examples of passive and active sensors built into the TAMS device 10. The magnetic speed sensors respond to changes in magnetic fields caused by the movement of magnetic targets near the magnetic speed sensor.

Example TAMS devices include an integrated variable reluctance (VR) sensor. A VR sensor can include a relatively small electromagnetic generator producing an analog alternating current (AC) signal that is proportional to the size, speed, and proximity of a ferromagnetic or other high permeability magnetic target, such as a tone-wheel, rotating nearby. A VR sensor can operate without an external electrical power source and can thus be categorized as a passive sensor. TAMS devices can include an integrated VR sensor for torque and angle measuring applications.

Figure 2B:
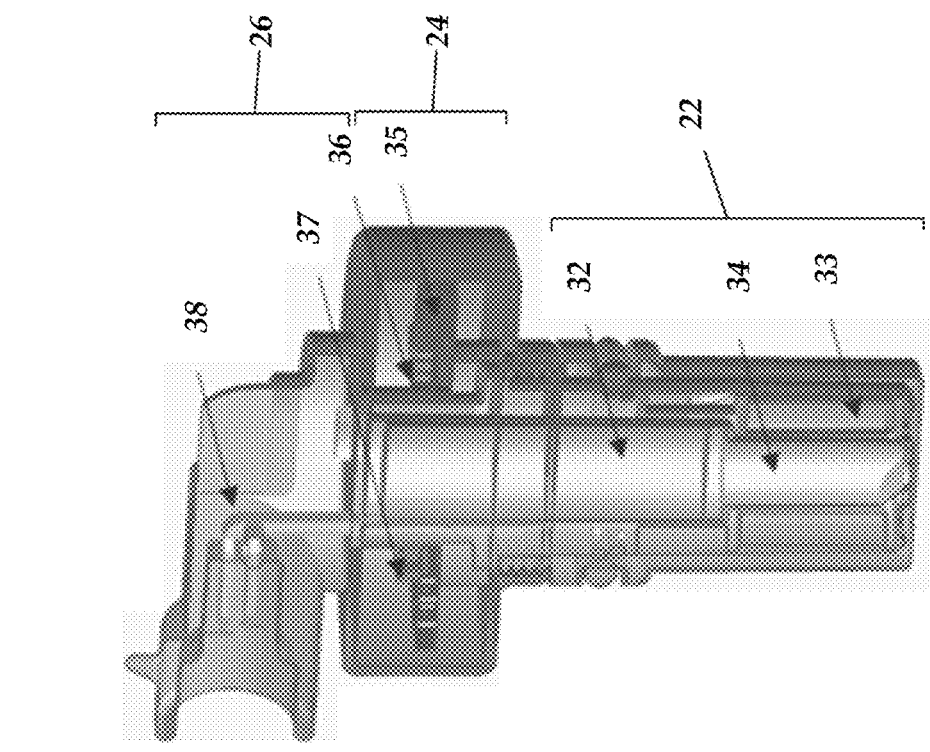
FIGS. 2A and 2B illustrate an example TAMS device with a variable reluctance sensor according to an embodiment.
Figure 2A:
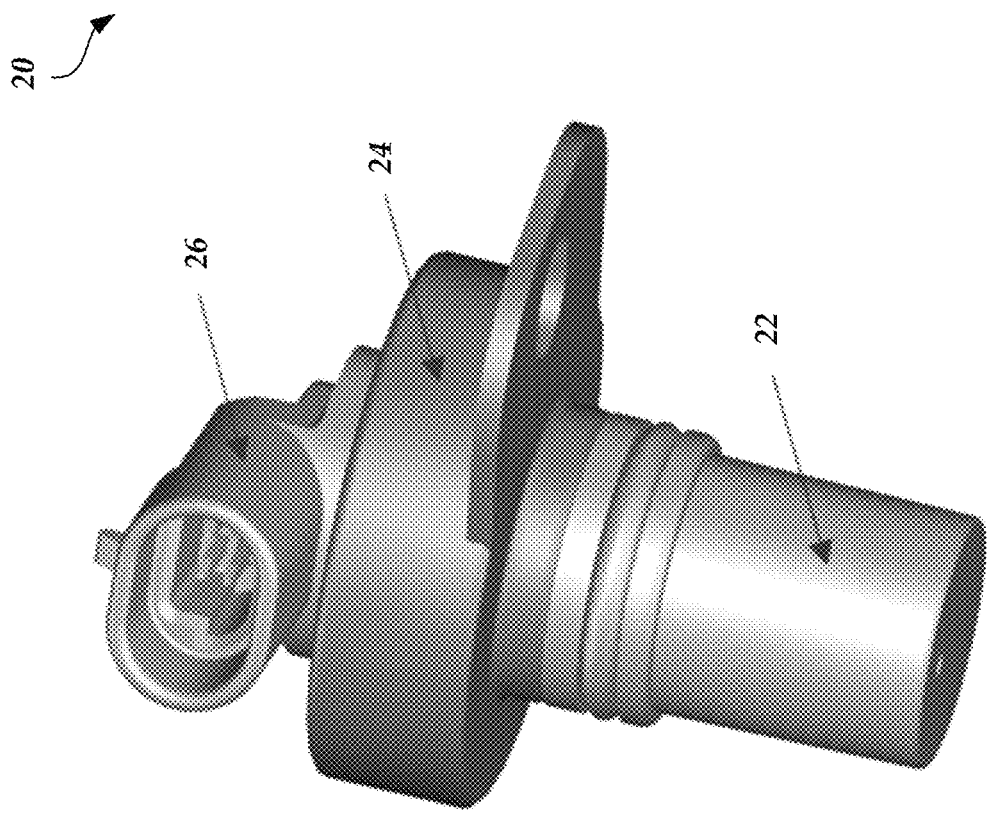
Figure 2C:
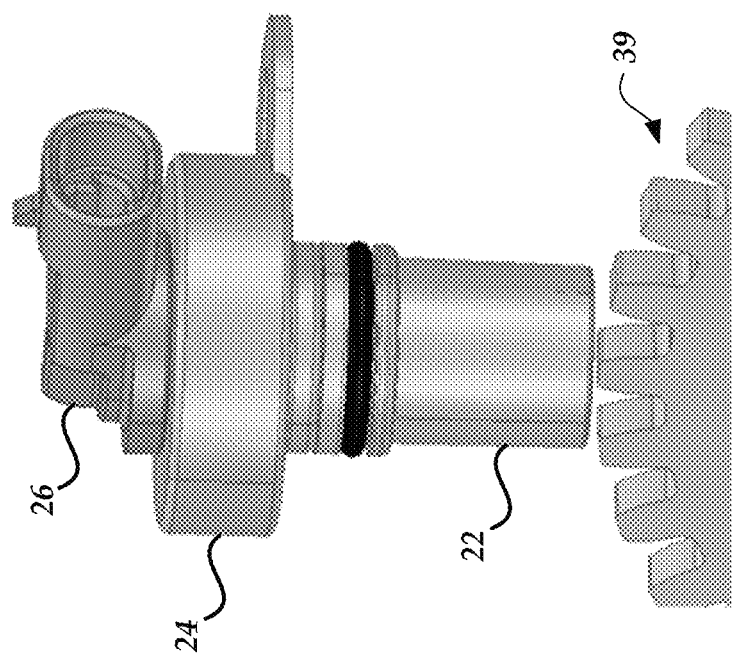
FIG. 2C illustrates the TAMS device of FIGS. 2A and 2B with a tone-wheel rotating in proximity to the variable reluctance sensor.

FIGS. 2A and 2B illustrate an example TAMS device 20 with an integrated VR sensor 22 according to an embodiment. FIG. 2A illustrates a model of the major structure of the TAMS device 20. FIG. 2B illustrates internal components of the TAMS device 20. As shown in FIG. 2A, the TAMS device 20 includes the VR sensor 22, an electronic signal processing module (ESPM) 24, and an I/O connector 26. The VR sensor 22 and the ESPM 24 are both within a housing of the TAMS device 20. FIG. 2B illustrates that the VR sensor 22 includes a magnet 32, a coil 33 of wire, and a pole piece 34. With continued reference to FIG. 2B, the ESPM 24 includes a printed circuit board (PCB) 35, a processing circuit 36, and a temperature sensor 37 positioned on the PCB 35. The processing circuit 36 can include a microcontroller, for example. The I/O connector 26 can include I/O connector contacts 38 as shown in FIG. 2B. The I/O connector contacts 38 can be I/O connector pins.

In some embodiments, the TAMS device 20 can store second reference information that is pre-programmed or otherwise determined. The secondary reference information can be pre-programmed from a signal received at an I/O interface of the TAMS device 20. The secondary reference information can be generated by the TAMS device 20 without an external sensor. For example, in some instances, the secondary reference information can be determined from reference wheel with no load at different directional speeds. The secondary reference information can be stored and/or programmed in memory of the TAMS device 20. The secondary reference information can represent a reference value. The secondary reference information can include one or more input values for a function executed by a processing circuit of the TAMS device 20 to compute a reference value. For instance, a value can be input to a function similar to the curves in FIGS. 3A and/or 3B that is executed by the processing circuit to determine the reference value. With the secondary reference information, the TAMS device 20 alone can determine an indication of torque applied to a shaft based on at least the secondary information and an output of the VR sensor 22. The TAMS device 20 can be programmable to compute torque based on (1) a signal from an internal sensor and secondary information stored in memory and/or (2) a signal from an internal sensor and a signal from an external sensor. In an embodiment, a TAMS device 20 can compare torque computed based on (1) a signal from an internal sensor and secondary information stored in memory and (2) a signal from an internal sensor and a signal from an external sensor.

FIG. 2C illustrates the TAMS device 20 with a tone-wheel 39 rotating in proximity to the VR sensor 22. A portion of the tone-wheel 39 is shown in FIG. 2C. The tone-wheel 39 is a ferromagnetic tone-wheel. Example ferromagnetic tone-wheels can include transition metals such as iron, nickel, cobalt, and their alloys). Accordingly, the tone-wheel 39 can be a metallic target with specific magnetic properties (e.g. carbon steel 1008 or 1010 with typical permeability of 500 to 800). As illustrated, the tone-wheel 39 has gears. The VR sensor 22 can detect a speed and/or angle based on the rotation of the tone-wheel 39.

A mathematical model for a VR sensor output voltage operating in conjunction with a rotational tone-wheel 39 (e.g., as shown in FIG. 2C) can be represented by Equations 1 to 6. These equations can be derived from Faraday's Law and Lenz's Law. Test data indicate that a mathematical model based on Equations 1 to 6 is accurate.

$$V(t, \theta_a, \text{RPM}, x) = 0.5 * V_{pp}(\text{RPM}, x) * \sin(\pi/30 * \text{RPM} * N_t * t + \Delta\phi_a) \quad \text{(Eq. 1)}$$

$$\Delta\phi_a = K * \theta_a * 2 * \pi / \theta_p \quad \text{(Eq. 2)}$$

$$V_{pp}(\text{RPM}, x) = C(x) * \text{RPM} \quad \text{(Eq. 3)}$$

$$C(x) = K_B * B_{pp}(x) \quad \text{(Eq. 4)}$$

$$K_B = N_c * A_c * N_t * \pi / 30 \quad \text{(Eq. 5)}$$

$$B_{pp}(x) = C_1 * e^{(-C_2 * x)} \quad \text{(Eq. 6)}$$

As denoted in Equations 1 and 2, the dynamic output electrical signal voltage $V(t, \theta_a, \text{RPM}, x)$ generated by a VR sensor 22 can be directly proportional to the time (t), the rotational speed of the target (RPM), the gap between the sensor 22 and the tone-wheel teeth (x), and the angle ($\theta_a$) or phase change ($\Delta\phi_a$) due to the applied torque on a shaft connected to the tone-wheel 39. The parameters C1 and C2 in Equation 6 and K in Equation 2 are constants.

The electrical frequency of the VR sensor electrical signal output can be determined by the mechanical rotational speed (RPM) and predesigned number of teeth (Nt) of the tone-wheel gear.

The mechanical gear pitch ($\theta_p$) of the tone-wheel can be determined by the number of teeth on tone-wheel per design ($\theta_p = 360°/N_t$). Accordingly, the mechanical gear pitch (and/ or number of the gear teeth) can affect both electrical frequency of the VR sensor signal output and the resolution of computed angle and/or torque measurement.

The peak to peak amplitude of the VR sensor output voltage Vpp (RPM, x) can be a linear function of the mechanical gear rotational speed (RPM) at a fixed operational air gap (x), as shown in Equation 3.

Figure 3A:
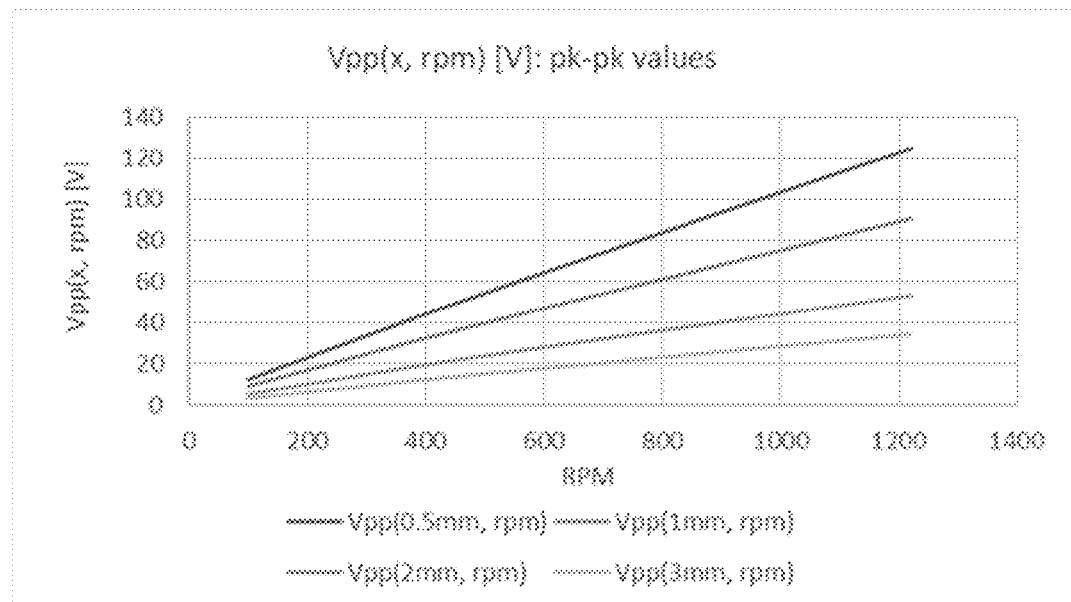
FIG. 3A is a graph that shows curves generated from test data for each of four different fixed operational gaps between a tone-wheel and a variable reluctance sensor of a TAMS device.

Curves shown in FIG. 3A generated from test data show linearity of Vpp (x, RPM) at several fixed operational gaps (x) between a tone-wheel and a VR sensor in a range between 0.5 mm (millimeter) and 3 mm.

As expressed in Equations 3 to 6, the peak to peak amplitude of the VR sensor output voltage Vpp (RPM, x) can be proportional to a non-linear function C(x) decaying exponentially as the air gap changes at a fixed RPM.

Figure 3B:
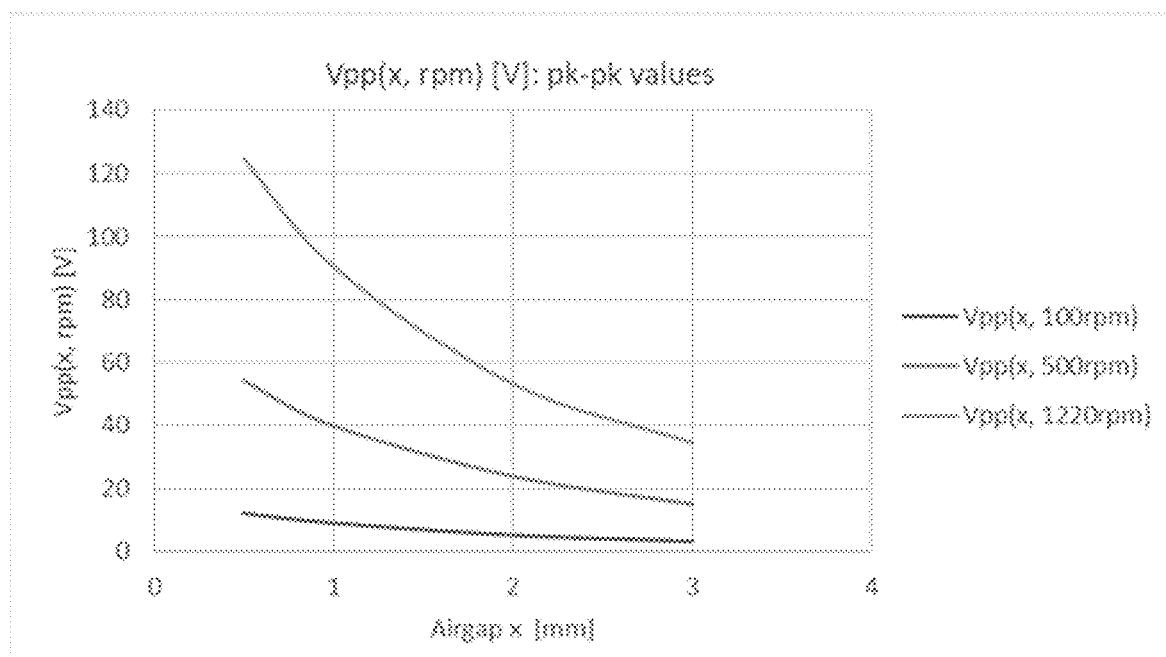
FIG. 3B is a graph that plots variable reluctance sensor output voltage of a TAMS device at various air gap distances for each of three different fixed rotational speeds.

FIG. 3B plots the VR sensor output voltage Vpp (x, RPM) decaying exponentially as air gap changes between 0.5 mm and 3 mm at several fixed RPM.

Equations 3 to 6 also indicate the amplitude of the VR sensor output voltage can be predetermined by particular physical design parameters, such as number of turns (Nc) in the coil of wire, the cross-sectional area of the coil (Ac), and number of tone-wheel teeth (Nt). As the tone-wheel gear rotates, the physical air gap x between the VR sensor and the gear teeth can also change, causing the magnitude of the magnetic flux B(x) to change with respect to the air gap. The peak to peak flux density change Bpp(x) can be finely approximated with a non-linear decaying exponential function given in Equation 6.

The dynamic output electrical voltages $V(t, \theta a, RPM, x)$ generated by both an internal built-in VR sensor and an external VR sensor can be provided to the ESPM 24 (FIGS. 2A-2C) of the TAMS device 20. The ESPM 24 can further process these signals at I/O interfaces and/or a microcontroller.

Figure 4B:
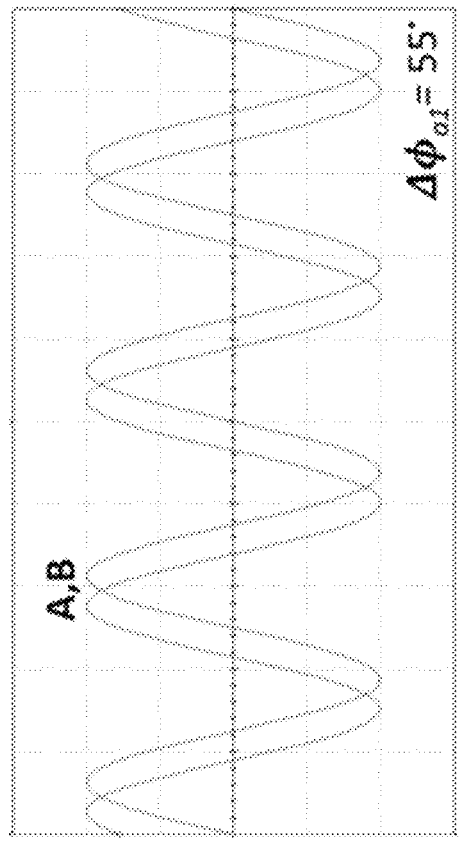
FIGS. 4A and 4B are graphs that plot phase differences between a variable reluctance sensor of a TAMS device and an external variable reluctance sensor.
Figure 4A:
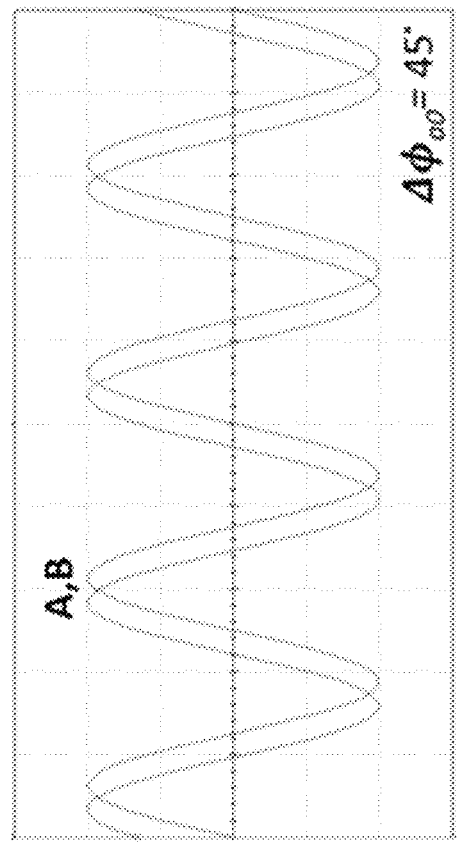

FIGS. 4A and 4B are graphs that plot phase differences between a VR sensor of a TAMS device and an external VR sensor. These differences can be detected in an ESPM of the TAMS device. In FIG. 4A, the initial phase difference $\Delta\phi a0$ is 45°. Then a torque is applied to a shaft with a tone-wheel. As shown in FIG. 4B, the phase difference changes to an adjusted phase difference $\Delta\phi a1$ of 55°. The torque applied to the shaft can be proportional to differential phase difference ($\Delta\phi a1 - \Delta\phi a0$) between the two output signals from the two VR sensors computed and/or measured in the ESPM. Two analog signals A and B shown in FIGS. 4A and 4B can be digitalized (or pulsated via zero-crossing) and then differenced (A-B) by a microcontroller alone or in conjunction with another circuit.

Figure 4C:
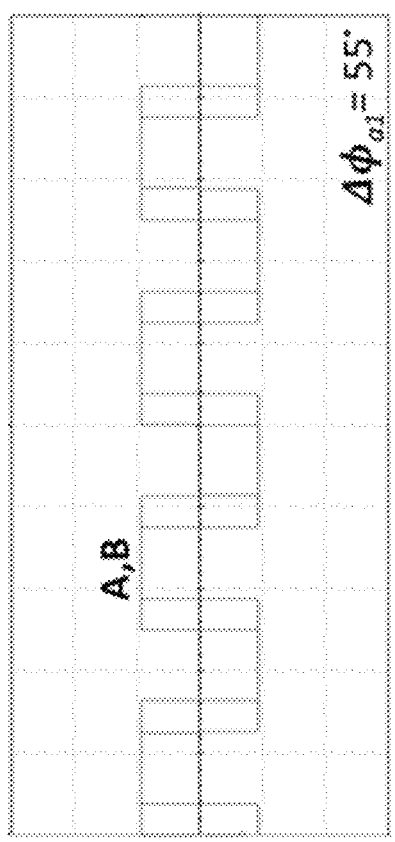
FIGS. 4C and 4D are graphs of digitized versions of the signals of FIGS. 4A and 4B, respectively.
Figure 4D:
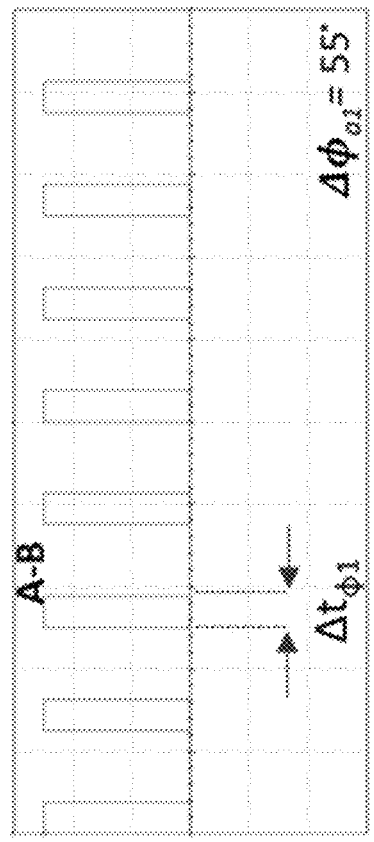

FIGS. 4C and 4D are graphs of digitized versions of the signals of FIGS. 4A and 4B. As discussed below, these graphs can alternatively represent outputs of active sensors. A zero-crossing of the signals from the two VR sensors can be detected by the ESPM of a TAMS device. Alternatively, or additionally, any other suitable point associated with the waveforms of the two VR signals can be detected.

Figure 4E:
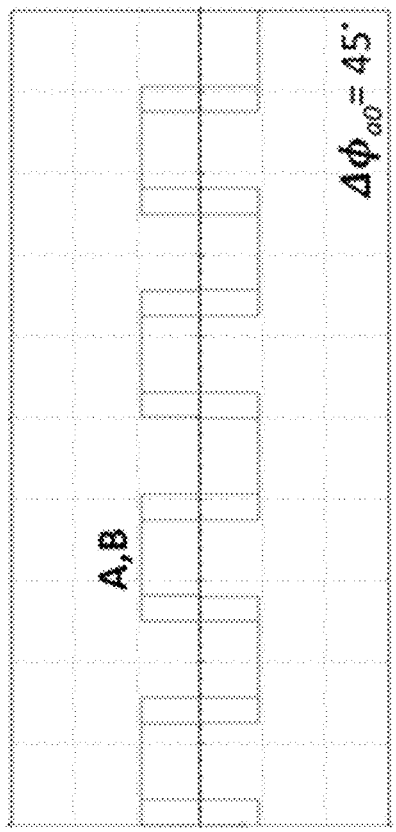
FIGS. 4E and 4F are graphs that show the differential phase signals corresponding to FIGS. 4C and 4D, respectively.
Figure 4F:
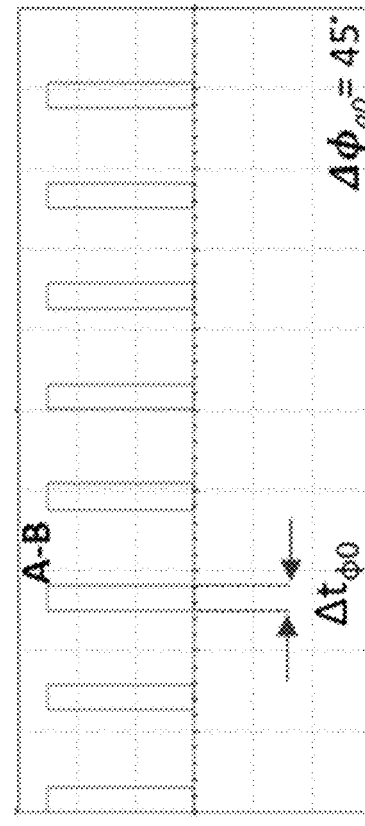

Differential phase signals of digitized VR signals from the VR sensor of a TAMS device and an external VR sensor (which may or may not be a second TAMS device) can be generated. FIGS. 4E and 4F are graphs that show the differential phase signals corresponding to FIGS. 4C and 4D, respectively. The differential phase signals represent a duration between zero crossings for the VR output signals from the two VR sensors. A time duration change associated with the differential phase signal in response to applying torque to the shaft with a tone-wheel can be directly proportional (with torsional stiffness coefficient of the shaft relating to its shape, dimensions, and material) to applied torque. The time duration can represent the difference between reference points (e.g., zero-crossings) of the VR signals from the VR sensor of the TAMS device and the external VR sensor. The time duration change can represent the difference in pulse length between the pulses in FIG. 4E and FIG. 4F. The time duration change can be calculated by the ESPM of the TAMS device. The ESPM can convert the time duration change to a torque value.

The physical properties of the shaft and tone-wheel materials are subjected to change by temperature changes. In some instances where this temperature effect is not negligible, the ESPM can compensate the torque value based on an indication of temperature from the temperature sensor and stored calibration data in memory of the ESPM. The ESPM can then output both a measured torque value and temperature value from the TAMS device. The indications of torque and/or temperature value can be a digital and/or analog signals in certain applications.

FIG. 5 is a plot of an uncompensated torque signal provided as an analog output of the EPSM and a linear reference curve. The uncompensated torque signal in FIG. 5 is a root mean squared (RMS) voltage. The uncompensated torque signal represents RMS voltage as function of the differential phase ($\Delta\phi a1 - \Delta\phi a0$) between an output signal of the VR sensor of the TAMS device and an output signal of an external VR signal.

Sensor operational temperature change can affect physical parameters of the VR sensor structure, air gap, and/or functional operations of the ESPM components causing change in output voltage $V(t, \theta a, RPM, x)$ of the internal VR sensor of the TAMS device and the external VR sensor. The temperature change can cause a change in magnetic field strength (e.g., parameters K, $K_B$, C1, C2) and ultimately change the gain and the phase of the TAMS output voltage. The temperature change can affect the slope and offset values of the linear output voltage of the TAMS device as shown in FIG. 5. The TAMS device output voltage can be compensated for the change of the offset and slope due to temperature change. The TAMS device can be calibrated to operate for a desired range of temperature operation (e.g., from about −40° C. to +150° C.). The compensated torque signal can be similar to the linear reference curve shown in FIG. 5.

In some embodiments, a TAMS device includes an active speed sensor. The active speed sensor receives power from an external source to function. One example of an active sensor is a back-biased Hall-effect speed sensor. The Hall-effect sensor can provide a digital output signal having a frequency that is directly proportional to speed. Unlike an output signal of certain VR sensors, the amplitude of the active sensor output signal may not change with the speed of the magnetic target (e.g., tone-wheel with gears). Examples of torque measurement systems without two active sensors will now be discussed.

FIGS. 6A and 6B illustrate an example TAMS device 60 with an integrated active sensor 62 according to an embodiment. FIG. 6A illustrates a model of the major structure of the TAMS device 60. FIG. 6B illustrates the active sensor 62 in the TAMS device 60. The active sensor 62 is a back-biased Hall-effect sensor in the TAMS device 60. As shown in FIG. 6A, the TAMS device 60 includes the active sensor 62, an ESPM 64, and an I/O connector 26. The active sensor 62 and the ESPM 64 are both within a housing of the TAMS device 26. The ESPM 64 can include any suitable features of the ESPM 24 of FIG. 2A. The ESPM 64 is configured to compute an indication of torque based on an output of the active sensor 62 and a sensor external to the TAMS device 60.

An output signal of the active sensor 62 can toggle between a known high value and a known low value. Regardless of the technology (e.g., magnetic, inductive, optical sensors), the output signals of the active speed sensor assemblies may be substantially the same. The graphs shown in FIGS. 4C and 4D can be representative of output signals (A and B) of an active sensor 62 integrated in the TAMS device 60 and an external active sensor at 45° and 55° phase differences. These signals can be processed by the ESPM 64 of the TAMS device 60 to generate the differential phase ($\Delta\phi a1-\Delta\phi a0$) signal shown in FIGS. 4E and 4F. Torque applied to the shaft can be proportional (with torsional stiffness coefficient of the shaft relating to its shape, dimensions, and material) to this differential phase between the two active sensor output signals A and B. This process can be performed in any suitable processing circuit, such as microcontroller only or a microcontroller in conjunction with another circuit.

In some embodiments, a torque measurement system can include an active sensor and a passive sensor. For example, a torque measurement system can include a VR sensor and a magnetic Hall effect sensor. Torque applied to a shaft can be determined from output signals provided by these sensors. The output of one of the sensors can be processed to generate a signal of a format similar to the other sensor. For example, a VR sensor can generate an output signal represented by FIG. 4A. This output signal can be processed to generate a signal represented by FIG. 4C. The Hall effect sensor can generate an output signal represented in FIG. 4C. Torque applied to a shaft can then be determined based on two signals represented in FIG. 4C, for example, as discussed above.

The TAMS devices disclosed herein can include a programmable ESPM configured to monitor and process information received from both an internal sensor and an external sensor. Also, the TAMS devices disclosed herein can include a programmable ESPM configured to learn and memorize reference signals at different conditions (e.g., air gaps, speeds, temperatures, etc.), and monitor and process information received from internal sensor in compared with reference signals in memory. The ESPM is an example of a processing circuit. The ESPM determines and outputs an indication of torque applied to a shaft with or without associated temperature information. The ESPM can also output diagnostic status. The ESPM can provide the indication of torque and/or the diagnostic status to an electronic control module (ECU) that is external to the TAMS device. This information can be provided in an analog and/or a digital format. In certain applications, the ESPM (e.g., the ESPM 24 of FIG. 2A or the ESPM 64 of FIG. 6A) includes a microcontroller to process signals indicative of speed and/or angle and generate an indication of torque with/ without associated temperature information. In some applications, the ESPM (e.g., the ESPM 24 of FIG. 2A or the ESPM 64 of FIG. 6A) also include additionally circuitry for functional redundancy. The additional circuitry can include phase difference circuit, such as a XOR logic gate, configured to generate a phase difference between an output signal from an internal sensor of a TAMS device and an output of a sensor external to the TAMS device. The ESPM can include one or more amplifiers, one or more transistors, one or more logic gates, one or more state elements (e.g., a flip-flop or a latch), one or more resistors, one or more capacitors, one or more diodes, the like, or any suitable combination thereof as well as a microcontroller. The TAMS device I/Os can be protected for forward and reverse overvoltages, electromagnetic compatibility/interferes (EMC/EMI), and electrostatic discharges (ESD).

Torque measurement systems for measuring torque applied to a shaft will now be discussed. In these torque measurement systems, a TAMS device together with another TAMS device or other sensor can be used to measure torque applied to the shaft. In certain embodiments, a torque measurement system includes one TAMS device configured as a master unit and another TAMS device configured as a slave unit. According to some other embodiments, a torque measurement system includes two TAMS devices configured as master units. In various embodiments, a torque measurement system includes one TAMS device configured as a master unit and a standalone speed sensor.

Figure 7:
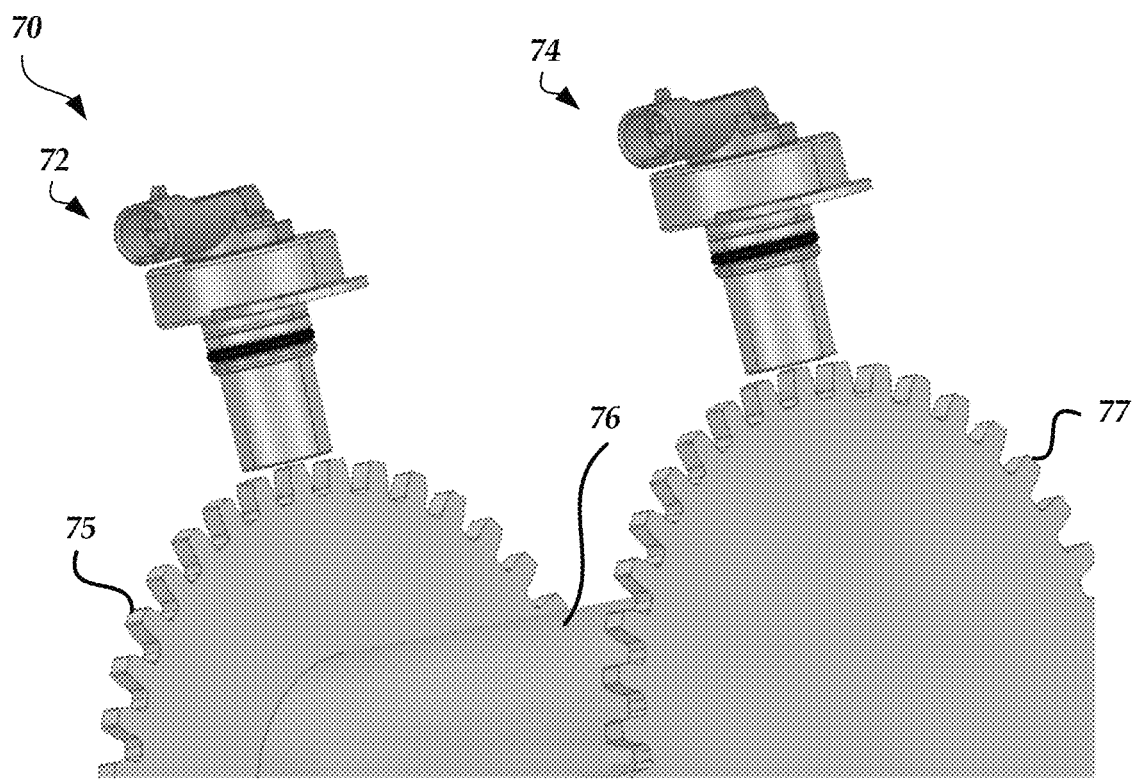
FIG. 7 illustrates an example torque measurement system with two TAMS devices according to an embodiment.

FIG. 7 illustrates an example torque measurement system 70 with two TAMS devices 72 and 74 according to an embodiment. The first TAMS device 72 is in proximity to a first tone-wheel 75 that is connected to a shaft 76. A sensor of the first TAMS device 72 is configured to detect an angle and speed associated with the first-tone wheel 75 rotating. The second TAMS device 74 is in proximity to a second tone-wheel 77 that is connected to the shaft 76. A sensor of the second TAMS device 74 is configured to detect an angle and speed associated with the second-tone wheel 77 rotating. A phase difference between signals generated by respective sensors of the TAMS devices 72 and 74 can change in response to torque being applied to the shaft 76. As torque is applied to the shaft 76, the tone-wheels 75 and 77 can rotate in opposite directions relative to one another. The first TAMS device 72 can include any suitable combination of features of the TAMS devices disclosed herein, such as the TAMS device 10, the TAMS device 20 or the TAMS device 60. Similarly, the second TAMS device 74 can include any suitable combination of features of the TAMS devices disclosed herein, such as the TAMS device 10, the TAMS device 20 or the TAMS device 60. The first TAMS device 72 can be programmed as a master unit and the second TAMS device 74 can be programmed as a slave unit. Alternatively, the TAMS devices 72 and 74 can both be programmed as master units. A master unit can compute torque based on an output signal of an internal sensor of the master unit and an output from an external sensor. A slave unit can output a signal indicative of angle and/or speed associated with a reference connected to a shaft for use by a master unit to compute torque applied to the shaft.

Figure 8:
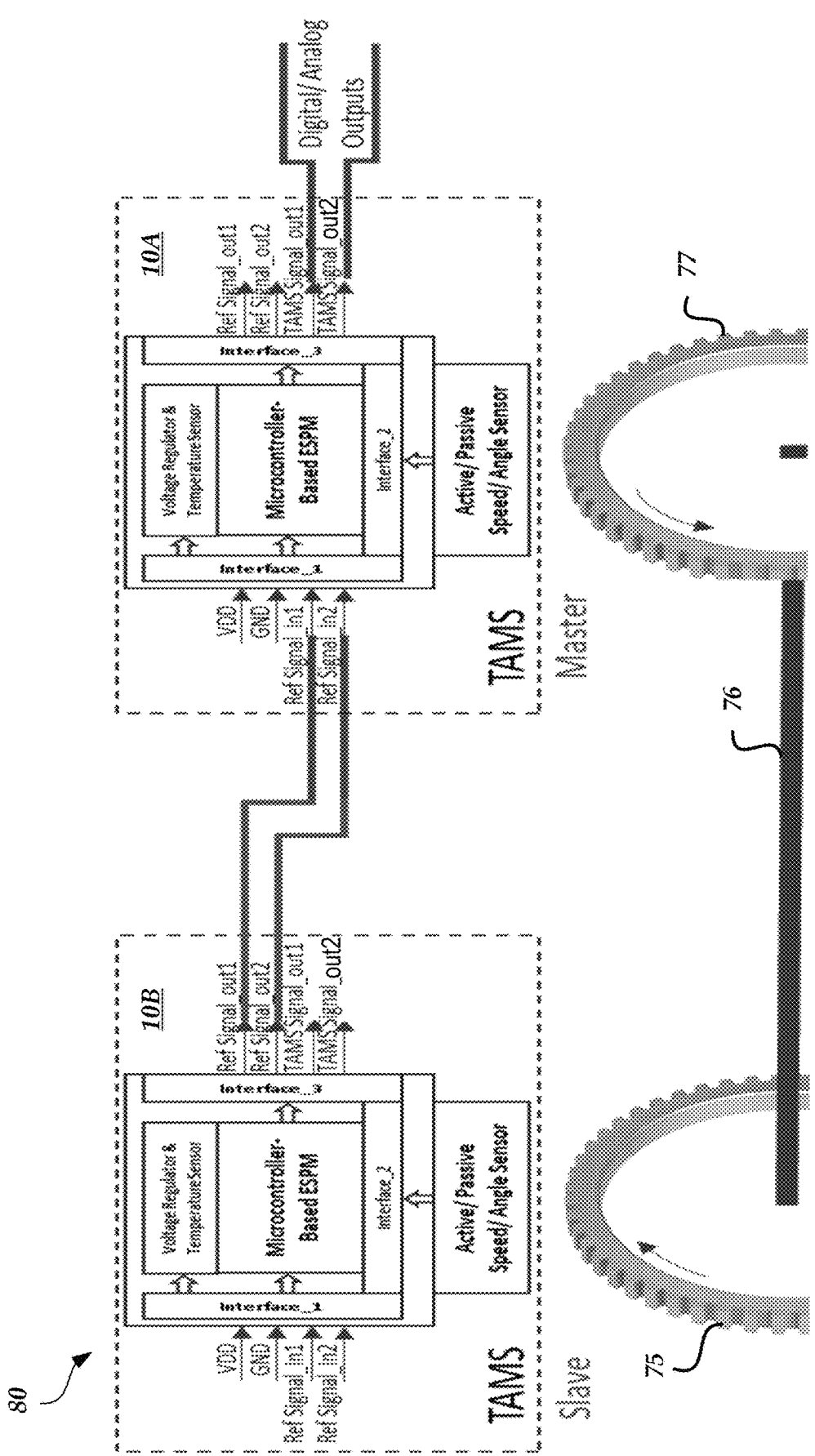
FIG. 8 is a schematic diagram of an example torque measurement system with a master TAMS device and a slave TAMS device according to an embodiment.

FIG. 8 illustrates a schematic diagram of example torque measurement system 80 with a master TAMS device and a slave TAMS device according to an embodiment. In the torque measurement system 80, the first TAMS device 10A is programmed as a master unit and the second TAMS device 10B is programmed as a slave unit. The TAMS devices 10A and 10B of FIG. 8 can be substantially identical parts in terms of circuitry and calibration, but programmed into different modes. The TAMS devices 10A and 10B can be implemented in accordance with any suitable principles and advantages of the TAMS devices disclosed herein.

As a slave unit, the second TAMS device 10B can detect and transmit information indicative of an angle/speed and/or temperature associated with the first tone-wheel 75 to the first TAMS device 10A. The second TAMS device 10B can also detect and transmit angle/speed information (indicative of surface (e.g., gear tooth) profile) and/or related temperature associated with the first tone-wheel 75, and/or error/ diagnostics information to the first TAMS device 10A.

In the torque measurement system 80, reference signal outputs of the second TAMS device 10B are electrically connected to reference signal inputs of the first TAMS device 10A. One or more output references signals Ref Signal_Out1 and Ref Signal_Out2 generated by the second TAMS device 10B are received by contacts (e.g., pins) of the first TAMS device 10A. In various applications, the first TAMS device 10A can have at least one contact electrically connected to a contact of the second TAMS device 10B by a wire. One or more reference signals can be wirelessly communicated between TAMS devices in some other applications. In such applications, a TAMS device can include an antenna connected to a contact (e.g., a pad) of the TAMS device.

As a master unit, the first TAMS device 10A can compute torque applied to the shaft 76 based on an output of an internal sensor of the first TAMS device 10A and information from the second TAMS device 10B. The first TAMS device 10A can detect a differential phase difference associated with outputs of sensors of the TAMS devices 10A and 10B, calculate torque (and to compensate based on measured temperature if so configured), and verify information received from the second TAMS device 10B when configured as a master unit. The first TAMS device 10A can output one or more TAMS output signals TAMS Signal_Out1, TAMS Signal_Out2 that indicate the calculated torque applied to the shaft 76, and/or associated temperature, and/or error/diagnostics information. The one or more TAMS output signals TAMS Signal_Out1, TAMS Signal_Out2 can be provided to an ECU or other circuitry external to the torque measurement system 80.

Figure 9:
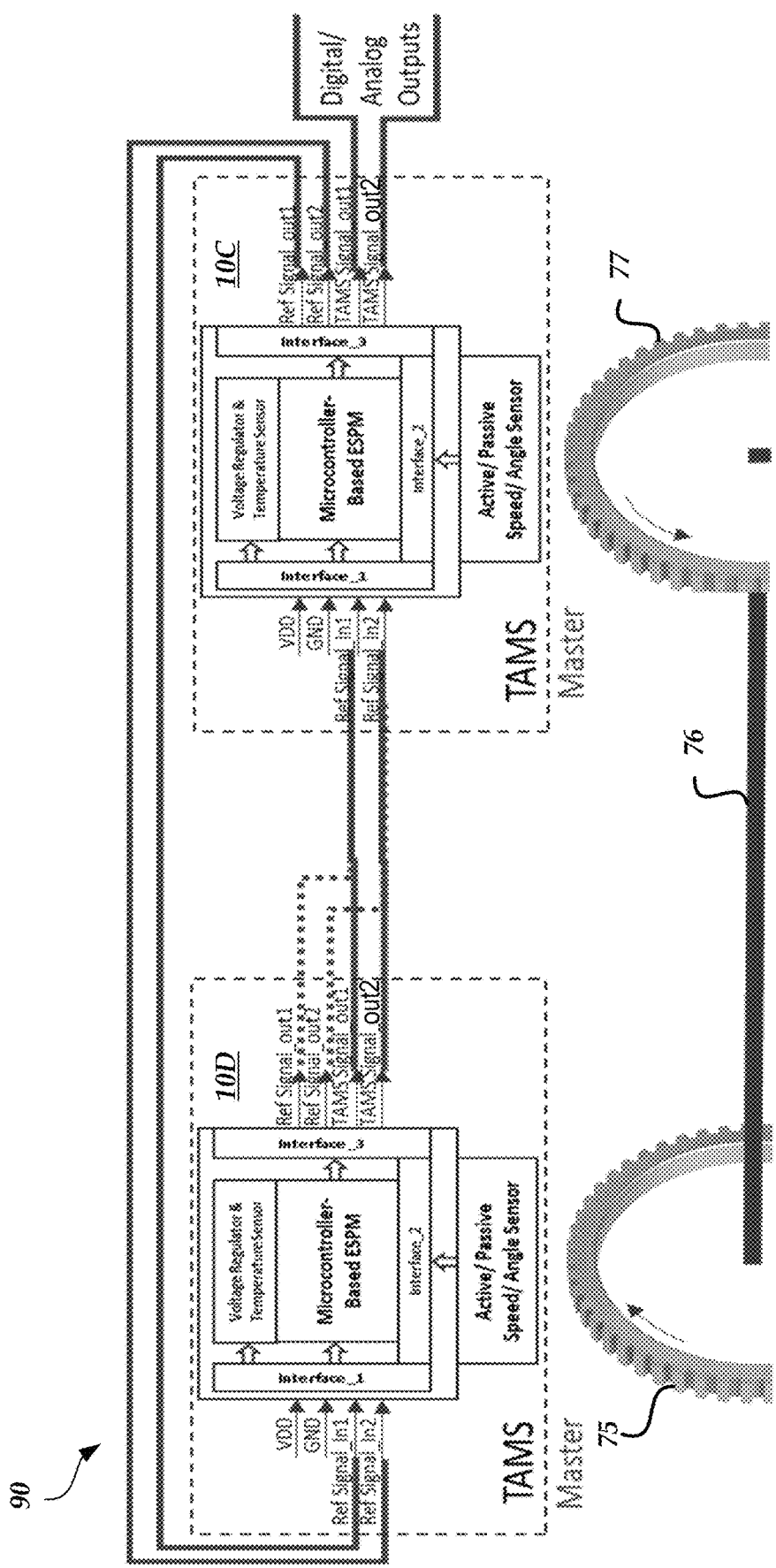
FIG. 9 is a schematic diagram of an example torque measurement system with two master TAMS devices according to an embodiment.

FIG. 9 illustrates a schematic diagram of example torque measurement system 90 with two master TAMS devices according to an embodiment. The torque measurement system 90 is an example of a system in which two different TAMS devices can compute torque. In the torque measurement system 90, the first TAMS device 10C is programmed as a first master unit and the second TAMS device 10D is programmed as a second master unit. The TAMS devices 10C and 10D of FIG. 9 can each be programmed to detect differential phase, calculate torque applied to the shaft 76, and verify the information received from each other. Accordingly, the TAMS devices 10C and 10D can both calculate torque applied to the shaft 76. The torque measurement system 90 provides functional redundancy, dynamic verification and plausibility of torque calculations with associated temperature information, and diagnostic/system health information. The torque measurement system 90 is advantageous in certain applications with specifications for safety and error compensation. The TAMS devices 10C and 10D can be substantially identical parts in terms of circuitry and calibration. The TAMS devices 10C and 10D can both be programmed into master mode. The TAMS devices 10C and 10D can be implemented in accordance with any suitable principles and advantages of the TAMS devices disclosed herein.

The second TAMS device 10D can provide one or more reference signals to the first TAMS device 10C. The first TAMS device 10C can compute torque based on an indication of angle/speed received from the second TAMS device 10D and an indication of angle/speed generated by an internal sensor of the first TAMS device 10C, where the indications of angle/speed are associated with different references (e.g., tone-wheels 75 and 77) associated with a shaft 76. The second TAMS device 10D can provide one or more TAMS signals indicative of torque calculated by the second TAMS device 10D to the first TAMS device 10C. The first TAMS device 10C can compare a first torque measurement generated by the first TAMS device 10C with a second torque measurement generated by the second TAMS device 10D to verify the torque measurements.

The first TAMS device 10C can provide one or more reference signals to the second TAMS device 10D. The second TAMS device 10D can compute torque based on an indication of angle/speed received from the first TAMS device 10C and an indication of angle/speed generated by an internal sensor of the second TAMS device 10D, where the indications of angle/speed are associated with different references (e.g., tone-wheels 75 and 77) associated with a shaft 76. Although not explicitly shown in FIG. 9, the first TAMS device 10C can provide one or more TAMS signals (angle, speed, torque, temperature, error, etc.) to the second TAMS mode 10D in certain applications. The second TAMS device 10D can compare a second torque measurement generated by the second TAMS device 10D with a first torque measurement generated by the first TAMS device 10C to verify the torque measurements.

Figure 10:
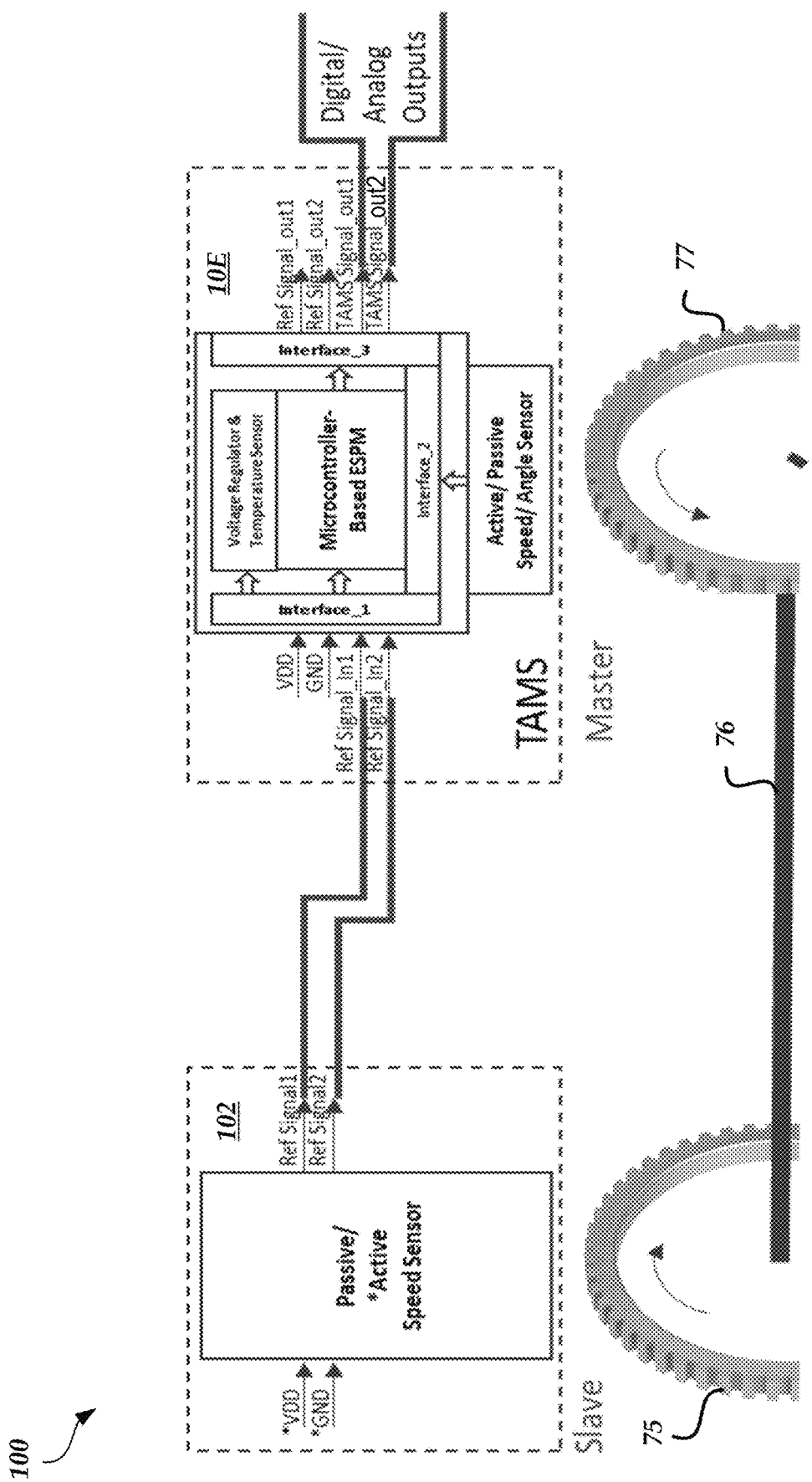
FIG. 10 is a schematic diagram of an example torque measurement system with a TAMS device and a standalone sensor according to an embodiment.

FIG. 10 illustrates a schematic diagram of example torque measurement system 100 with a TAMS device and a stand-alone sensor according to an embodiment. As illustrated, the torque measurement system 100 includes a TAMS device 10E programmed as a master unit and an external sensor 102. The external sensor 102 can be considered a slave unit. The TAMS device 10E can be programmed to work with the external sensor 102. The external sensor 102 can detect and transmit information indicative of angle/speed of the tone-wheel 75 to the TAMS device 10E. The external sensor 102 can provide surface profile information associated with the tone-wheel 75 (e.g., information related to tone-wheel tooth profile) to the TAMS device 10E. The external sensor 102 can be an active sensor. The external sensor 102 can be a passive sensor. A passive external sensor can be implemented without a power supply. A passive external sensor can be implemented without a contact to receive a supply voltage.

The TAMS device 10E can reference the information from the external sensor 102. The TAMS device 10E can compute torque based on an indication of angle/speed received from the external sensor 102 and an indication of angle/speed generated by an internal sensor of the TAMS device 10E, where the indications of angle/speed are associated with different references (e.g., tone-wheels 75 and 77) associated with a shaft 76. The TAMS device 10E can be programmed to detect differential phase, calculate torque applied to the shaft 76, and verify the information received from each other. The TAMS device 10E can be configured to output temperature information associated with calculated toque. The TAMS device 10E can be configured to output diagnostic information.

Figure 11A:
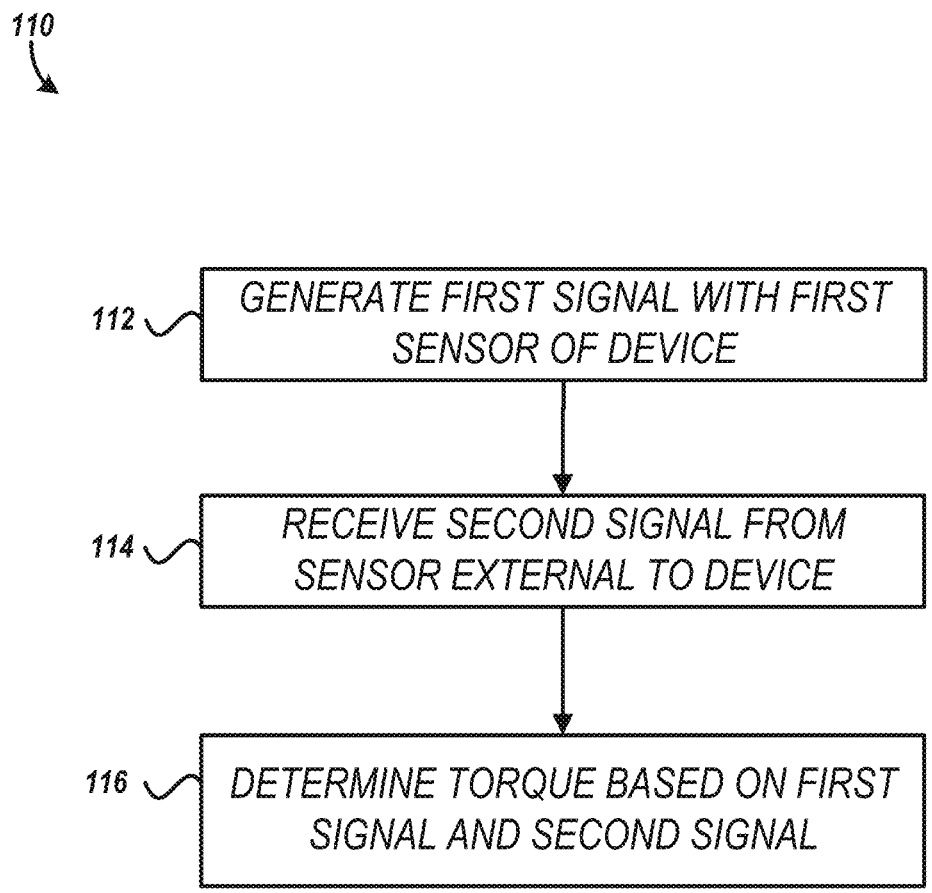
FIG. 11A is a flow diagram for a method of measuring torque applied to a shaft according to an embodiment.

FIG. 11A is a flow diagram for a method 110 of measuring torque applied to a shaft according to an embodiment. The method 110 can be performed using any of the TAMS devices disclosed herein and/or in any of the systems for measuring torque disclosed herein.

The method 110 includes generating a first signal indicative of an angle associated with a first reference connected to the shaft at block 112. The first signal is generated with a first sensor integrated in a device with a processing circuit (e.g., an ESPM). The device can be a TAMS device in accordance with any suitable principles and advantages disclosed herein. The device can be programmed as a master unit, where the device is also programmable as a slave unit. The first reference can be a tone-wheel or a magnet-wheel.

At block 114, a second signal indicative of an angle associated with a second reference connected to the shaft is received from a second sensor external to the device. The second sensor can be included in a second device. In one embodiment, the second device can be configured as a slave unit. In another embodiment, the second device can be programmed as a master unit.

An indication of torque applied to the shaft is determined at block 116. The processing circuit integrated in the device determines the indication of torque based on at least the first signal and the second signal. Determining the indication of torque can include detecting a phase difference between the first signal and the second signal in certain applications. Determining the indication of torque can include accessing calibration information stored in memory of the device. In certain applications, the processing circuit can compare a second indication of torque applied to the shaft generated by a second device with the indication of torque, in which the second device includes the second sensor. The shaft can be in a vehicle in various applications.

Figure 11B:
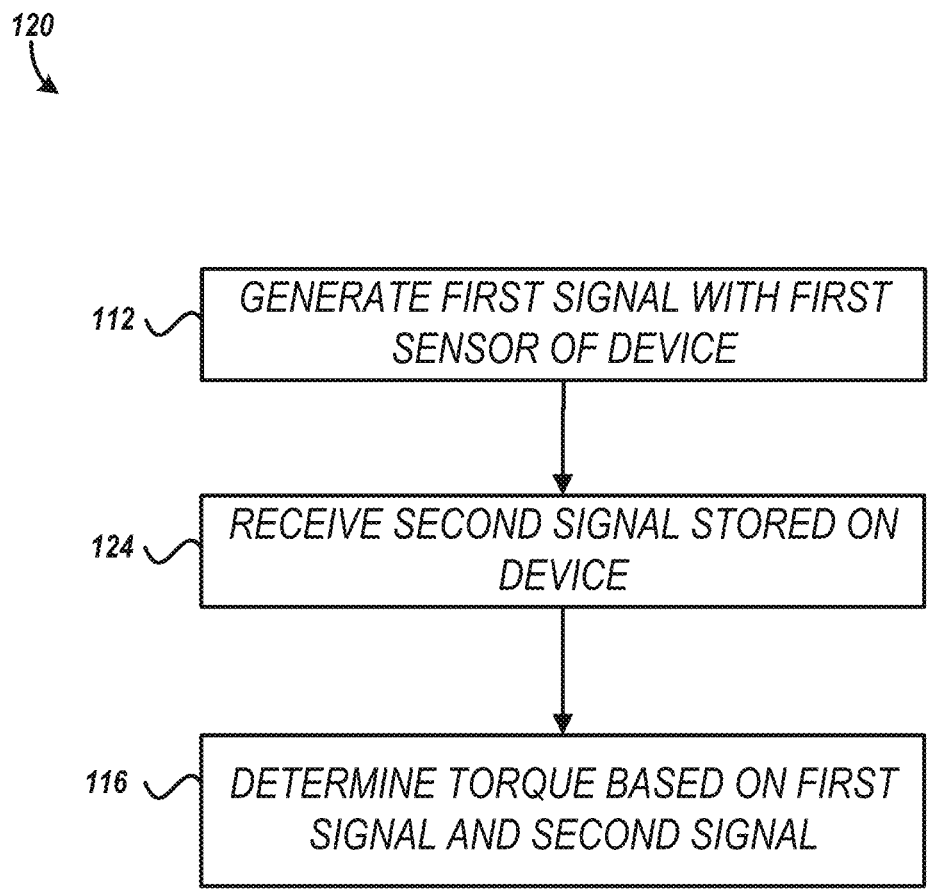
FIG. 11B is a flow diagram for a method of measuring torque applied to a shaft according to another embodiment.

Torque is determined based on a receiving a second sensor signal from a sensor external to a TAMs device in the method 110. In some other applications, torque can be determined based on secondary information stored on a TAMS device. The secondary information stored on the TAMS device can be a pre-programmed, learned, or memorized secondary reference (e.g., no load) signal. FIG. 11B is a flow diagram of a method 120 where torque is determined based on the secondary information stored on a TAMS device. The method 120 can determine torque without input from an external sensor. The method 120 is like the method 110 except that block 114 is replaced with block 124. TAMS devices disclosed herein can be programmable to implement the method 110 and/or the method 120.

At block 124, secondary information indicative of an angle associated with a second reference connected to the shaft can be pre-programmed, learned, and/or memorized at different conditions (angles, speeds, temperature, etc.) by the first sensor integrated in the device. In this case, the first sensor can operate stand-alone to measure and calculate torque based on the pre-programmed/memorized secondary reference information. The secondary information can be a reference value for computing torque. The secondary information can be a value input to a function executed by the processing circuit to determine a reference value for computing torque.

Unless the context indicates otherwise, throughout the description and the claims, the words "comprise," "comprising," "include," "including" and the like are to generally be construed in an inclusive sense, as opposed to an exclusive or exhaustive sense; that is to say, in the sense of "including, but not limited to." Conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. The word "connected," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. The term "or" is used in its inclusive sense (and not in its exclusive sense) so that when used, for example, to connect a list of elements, the term "or" means one, some, or all of the elements in the list. Where the context permits, words in the above Detailed Description using the singular or plural number may also include the plural or singular number respectively.

While certain embodiments have been described, these embodiments have been presented by way of example only, and are not intended to limit the scope of the disclosure. Indeed, the devices, systems, and methods described herein may be embodied in a variety of other forms. Furthermore, various omissions, substitutions, and changes in the form of the devices, systems, and methods described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. As will be recognized, certain embodiments described herein can be implemented within a form that does not provide all the features and benefits set forth herein, as some features can be used or practiced separately from others. Any suitable combination of the elements and/or acts of the various embodiments described above can be combined to provide further embodiments. All such modifications and variations are intended to be included herein within the scope of this disclosure. Further, additional embodiments created by combining any two or more features or techniques of one or more embodiments described herein are also intended to be included herein within the scope of this disclosure. The accompanying claims and their equivalents are intended to cover such forms or modifications as would fall within the scope and spirit of the disclosure.

What is claimed is:

1. A method of measuring torque applied to a shaft, the method comprising:
    generating, with a first sensor, a first signal indicative of an angle and/or speed associated with a first reference connected to the shaft;
    receiving, from a second sensor, a second signal indicative of an angle and/or speed associated with a second reference connected to the same shaft as the first reference;
    determining, with a first processing circuit, an indication of torque applied to the shaft based on at least the first signal and the second signal, wherein the first sensor and the first processing circuit are integrated in a device, wherein the second sensor is external to the device, and wherein the second sensor and a second processing circuit are integrated in a second device;
    comparing, by the first processing circuit, the indication of torque with a second indication of torque applied to the shaft generated by the second processing circuit; and
    outputting a torque measurement based on the comparing.

2. The method of claim 1, further comprising programming the device as a master unit, wherein the device is also programmable as a slave unit.

3. The method of claim 1, further comprising determining, with the second processing circuit, the second indication of torque based on the first signal.

4. The method of claim 3 further comprising programming the second device as a master unit prior to the determining the second indication of torque.

5. The method of claim 1, wherein said determining the indication of torque comprises detecting a phase difference between the first signal and the second signal.

6. The method of claim 1, wherein said determining the indication of torque comprises accessing calibration information stored in memory of the device.

7. The method of claim 1, wherein the first reference is a first tone-wheel, and wherein the second reference is a second tone-wheel.

8. The method of claim 1, further comprising:
detecting, using a temperature sensor of the device, an indication of temperature associated with the device; and
applying temperature compensation based on the indication of temperature, wherein the indication of torque is based on said applying.

9. The method of claim 1, wherein the shaft is located in a vehicle or a machine.

10. A torque and angle sensor device comprising:
an input contact configured to receive a second signal from an external device, the second signal indicative of a second reference angle/speed;
an output contact configured to provide a first measurement of torque applied to a single shaft;
a first sensor configured to generate a first signal indicative of a first angle/speed, wherein the first signal and the second signal are associated with the single shaft; and
a processing circuit configured to generate the first measurement of torque applied to the single shaft based on at least the first signal and the second signal and to output the first measurement of torque based on a comparison of the first measurement of torque with a second measurement of torque generated by the external device, wherein the first measurement of torque and the second measurement of torque are associated with the single shaft, and wherein the first sensor and the processing circuit are integrated within the torque and angle sensor device.

11. The torque and angle sensor device of claim 10, wherein the processing circuit is programmable to function as a master unit in a first mode and to function as a slave unit in a second mode.

12. The torque and angle sensor device of claim 10, further comprising a second output contact configured to provide the first signal.

13. The torque and angle sensor device of claim 10, wherein the first sensor is a variable reluctance sensor.

14. The torque and angle sensor device of claim 10, wherein the first sensor is a magnetic sensor.

15. The torque and angle sensor device of claim 10, wherein the first sensor is an inductive sensor.

16. The torque and angle sensor device of claim 10, wherein the first sensor is an optical sensor.

17. The torque and angle sensor device of claim 10, wherein the first signal is associated with a first tone-wheel or magnet-wheel connected to the single shaft, the second signal is associated with a second tone-wheel or magnet-wheel connected to the shaft.

18. The torque and angle sensor device of claim 10, wherein the processing circuit and the first sensor are both included within a housing of the torque and angle sensor device.

19. A system for measuring torque applied to a shaft, the system comprising:
a first torque and angle sensing device comprising a first sensor and a first processing circuit, the first sensor configured to generate a first signal indicative of an angle and/or speed associated with a first reference connected to the shaft, the first processing circuit configured to determine an indication of torque applied to the shaft based on at least the first signal and a second signal indicative of an angle and/or speed associated with a second reference connected to the shaft, and the first processing circuit configured to output a torque measurement based on a comparison of the first indication of torque with a second indication of torque applied to the shaft; and
a second torque and angle sensing device comprising a second sensor and a second processing circuit, the second sensor being external to the first torque and angle sensing device, the second sensor configured to generate the second signal indicative of the angle and/or speed associated with the second reference connected to the same shaft as the first reference, and the second processing circuit configured to generate the second indication of torque based on the second signal.

20. The system of claim 19, wherein the second torque and angle sensing device is programmable as a slave unit.

21. The system of claim 19, wherein the second torque and angle sensing device is configured to generate the second indication of torque applied to the shaft based on the first signal.

22. The system of claim 19, wherein the first torque and angle sensing device is programmable to function as a master unit in a first mode and to function as a slave unit in a second mode.

* * * * *